Nov. 17, 1953          R. L. KLEIN ET AL          2,659,113
                            WINDOW
Filed June 16, 1948                          5 Sheets-Sheet 1
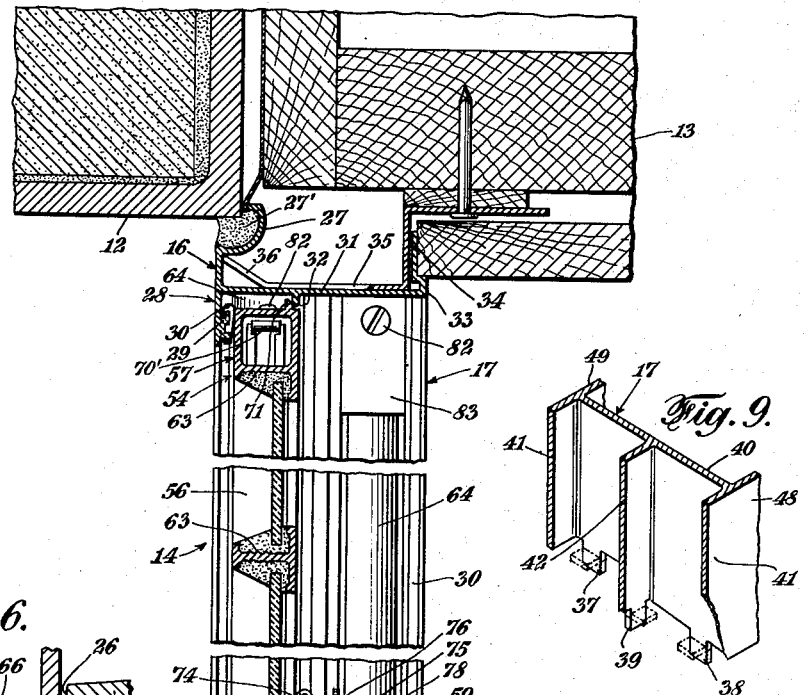
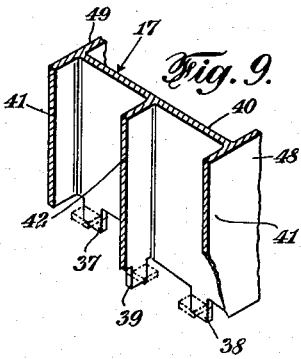
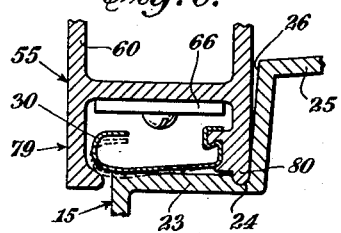
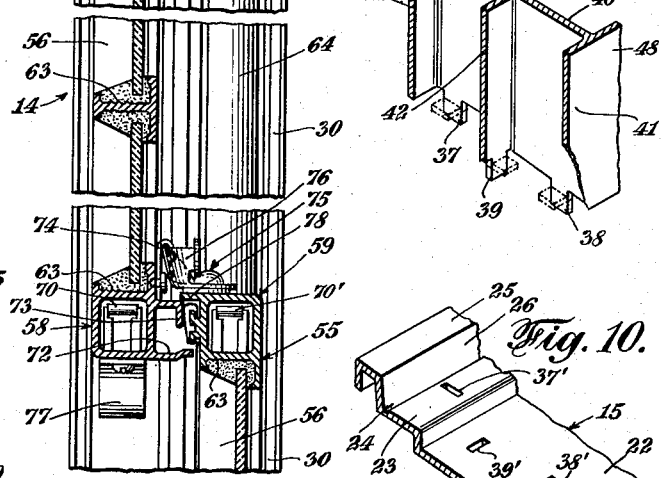
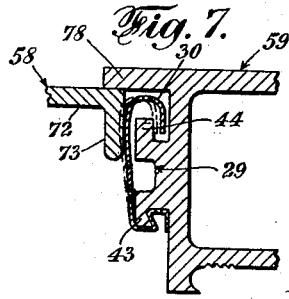
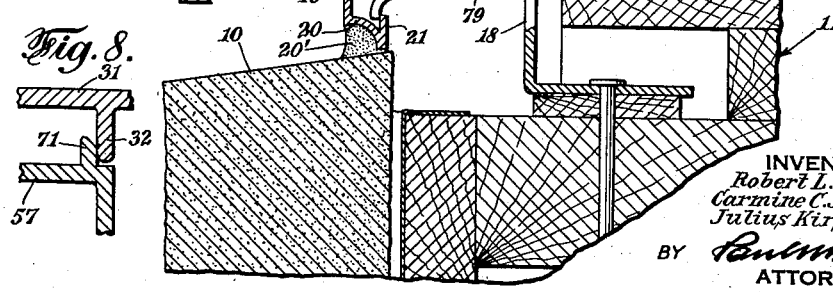
INVENTORS
Robert L. Klein
Carmine C. J. Maffei
Julius Kirschstein
BY
ATTORNEY

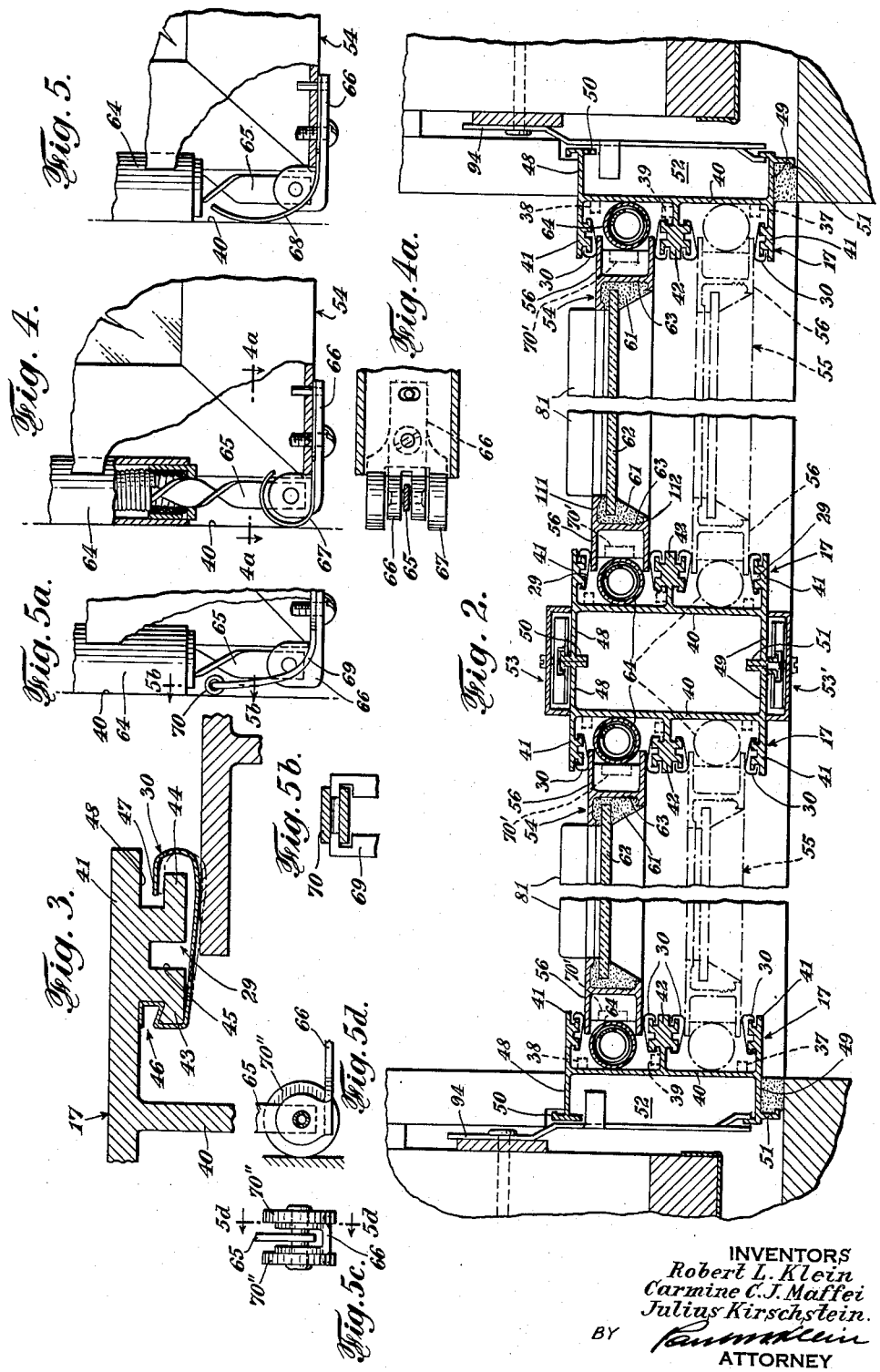

Nov. 17, 1953 — R. L. KLEIN ET AL — 2,659,113
WINDOW
Filed June 16, 1948 — 5 Sheets-Sheet 3

INVENTORS
Robert L. Klein
Carmine C. J. Maffei
Julius Kirschstein.
BY
ATTORNEY.

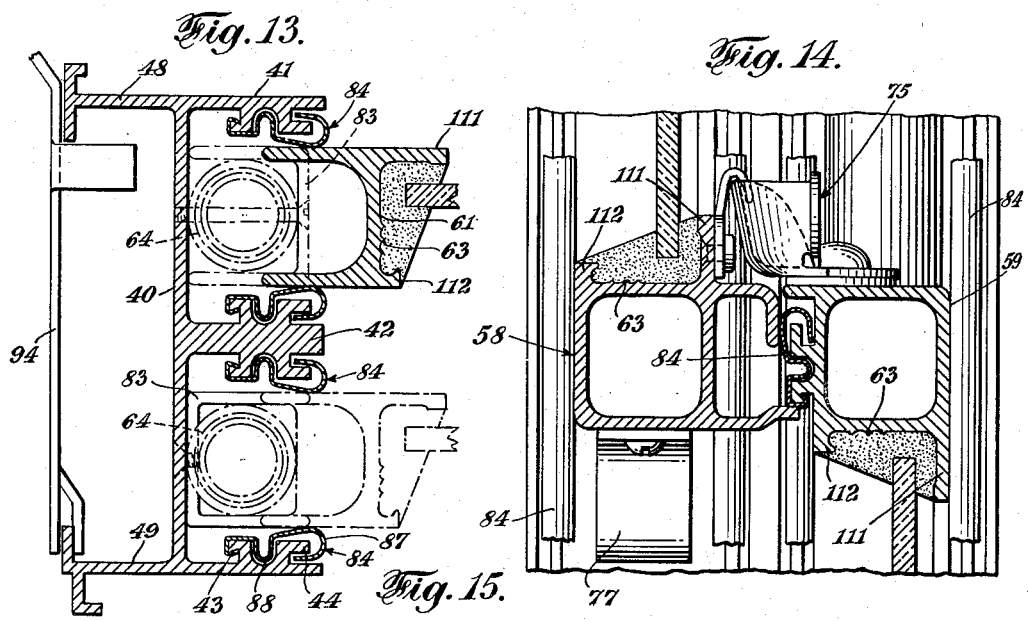
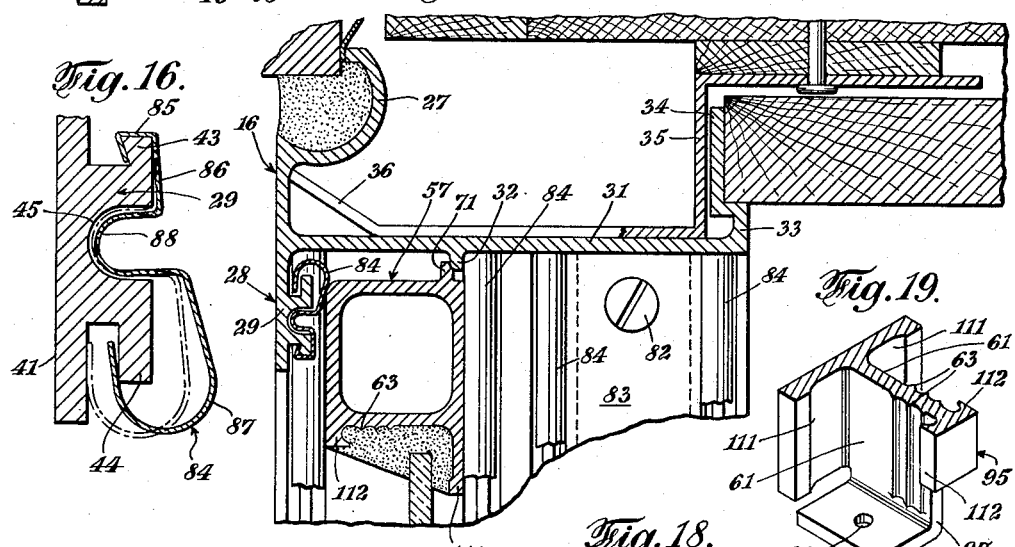
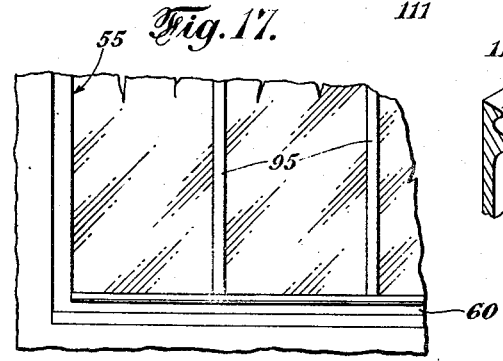
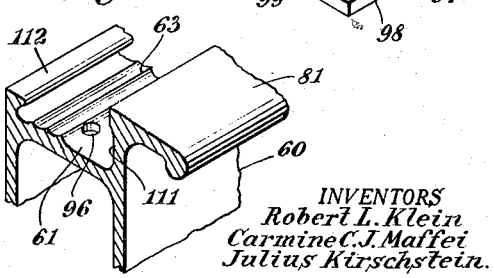

Nov. 17, 1953
R. L. KLEIN ET AL
2,659,113
WINDOW
Filed June 16, 1948
5 Sheets-Sheet 5
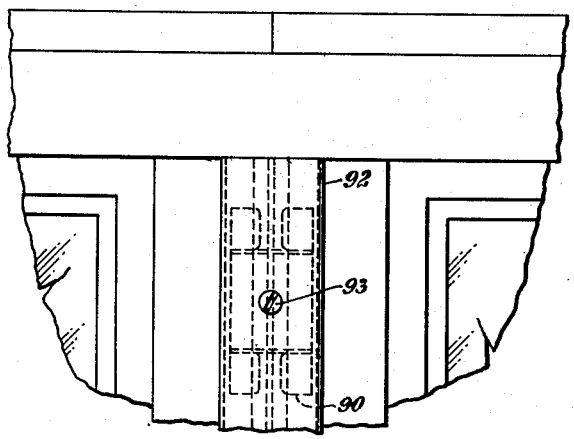
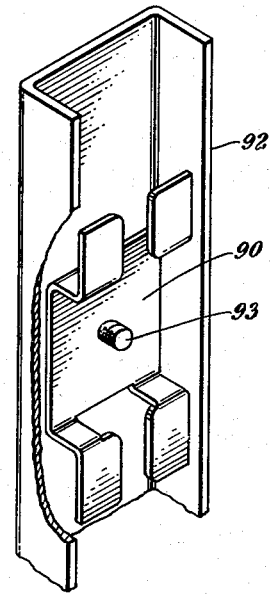
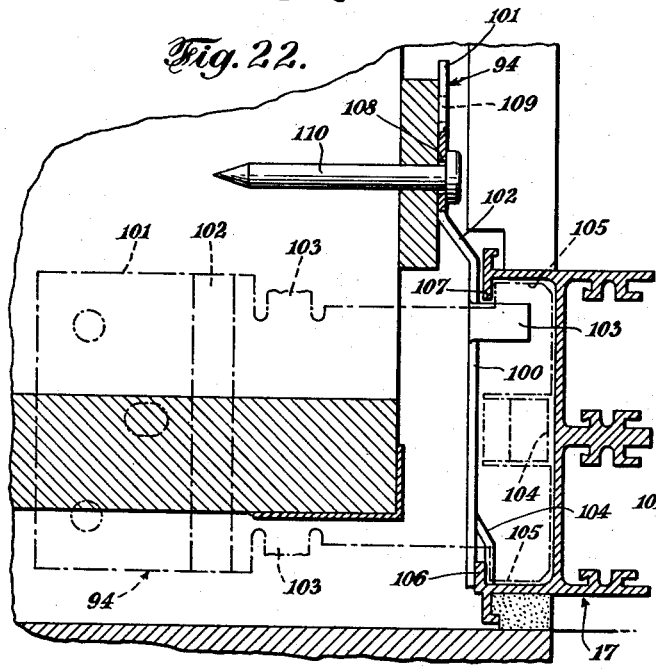
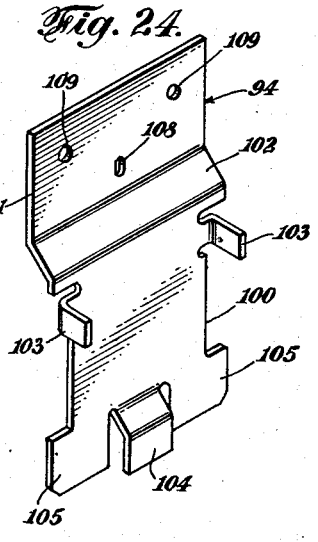
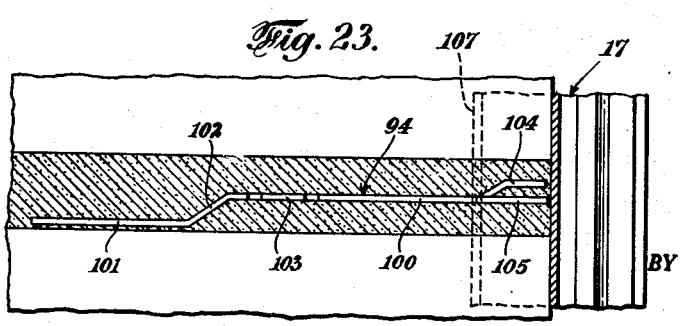
INVENTORS
Robert L. Klein
Carmine C. J. Maffei
Julius Kirschstein.
ATTORNEY.

Patented Nov. 17, 1953

2,659,113

UNITED STATES PATENT OFFICE 2,659,113

WINDOW

Robert L. Klein, Rochelle Park, N. J., and Carmine C. J. Maffei and Julius Kirschstein, Brooklyn, N. Y., assignors to Windalume Corporation, West New York, N. J., a corporation of New Jersey Application June 16, 1948, Serial No. 33,384

11 Claims. (Cl. 20—69)

This invention relates to windows in general, and to what may be termed double hung windows employing sliding sashes operative in a frame, and wherein all of the window constituents are intended to be fabricated from non-corrosive metal, such as aluminum, stainless steel, bronze, brass and the like.

Double hung windows made of metal are well known in the art, but their construction is either too complicated or too heavy, and therefore relatively costly, particular reference being had to the window frame. Some of the known window frames are made from an unnecessary number of assembled parts, entailing costly fabrication. Also the weather-stripping in heretofore structures has proven either inadequate or too complicated and costly in the manufacture and installation.

It is one of the important objects of the present invention to provide a simplified double hung window structure equipped with an effective weather-strip arrangement, and wherein the window frame is made of one-piece units, thus eliminating costly assembly, reducing the possibility of mistakes in its manufacture, and producing a relatively light-weight but sturdy window.

Another of the main objects of the present invention is the provision of a window comprising a window frame employing one-piece window jambs in which are operatively mounted individual weather-strips extending throughout the entire length of the jambs, and which weather-strips independently engage and are removably associated with the inner faces of the sash retaining flanges and with both faces of the parting bead or parting strip, and wherein the sash retaining flanges as well as the parting bead form integral, non-removable parts of the jamb members.

Another important object of the present invention is the provision of a weather-strip construction having a substantially channel-shaped design, adapted to operatively and removably engage opposite sash guiding portions of a jamb, and wherein one longitudinal edge of the weather-strip is relatively fixed, whereas its other edge is movable in respect to the jamb.

Another object of the present invention is to provide a window construction wherein is employed a rigid, substantially continuous outer window frame composed of a one-piece sill member, a one-piece head member and two one-piece jamb members, all members being rigidly connected with one another, and wherein the jamb members have integral sash retaining flanges and an integral parting bead or parting strip between the flanges, and wherein both faces of the parting bead and the inner faces of the sash retaining flanges are provided with anchoring elements for accommodating individual and independent weather-strips having a substantially channel-shaped cross section, and wherein one longitudinal edge of such weather-strips is removably secured to the anchoring elements of the inner faces of the sash retaining flanges and at both faces of the parting bead, while the other edge of the weather-strips is free to move relative to that sash retaining flange and said parting bead, the movable edges of the weather-strips being adapted to yieldably engage the outer side rail faces of the sashes operative in the window frame.

Another object of the present invention is to provide a window construction employing a window frame made of one-piece members, and wherein the sash retaining flanges and the parting strip of the jambs are provided with integral means for anchoring and operatively accommodating individual weather-strips, two for each sash, extending the entire length of the jambs and yieldably but firmly engaging the outer faces of the sashes and completely sealing the space between the jamb structures and the sashes and preventing the latter from rattling, while at the same time affording effortless movement of the sashes within the frame.

Another object of the present invention is to so construct a double hung window having a frame made of one-piece members that each of the sashes operative within the frame may be individually inserted into or removed from the frame without the removal and replacement of any part of the frame itself.

A further object of this invention is to provide a window frame having sill and head members equipped with exterior caulking-retaining channels of a substantially quarter circular cross section and extending over the entire length of these members.

Another object of the present invention is to provide a head member with a retaining flange for the top rail of the outer sash, said flange having anchoring means for a substantially channel-shaped weather-strip in fixed engagement with said anchoring means along one of its edges, while its other edge is movable relative to said anchoring means and is adapted to become engaged and compressed by and to form a weathertight seal with the top rail of the sash.

Another object of this invention is to provide in a window frame, substantially channel-shaped head and sill members having at one of their flanges hollow caulking-retaining beads of a substantially quarter circular cross section, and wherein means are provided adjacent to said beads for the accommodation of and the firm engagement by suitable anchoring means for retaining the head and sill members of the frame in correct relation to the building structure in which the window is mounted.

Still another object of the present invention is the provision of a weather-strip having a substantially channel-shaped cross section, and wherein one turned-in edge of the strip is adapted to become fixedly but removably associated with one edge of a corresponding supporting or anchoring element for the strip, while the opposite turned-in edge of the weather-strip is rendered movable and compressible by the face of a sash rail.

A further object of the present invention is to provide a continuous self-contained and independently operative weather-strip of a substantially channel-shaped cross section, wherein one bent-in edge thereof is smaller than its other, opposite bent-in edge and is adapted to be relatively stationary in respect to the window frame, whereas its other, larger bent-in edge is adapted to be operative in respect to the frame, and wherein a retention bead is formed between the two bent-in edges for limiting the bodily movement of the weather-strip in respect to, and for preventing its inadvertent disengagement from the frame portion with which it is removably associated.

Another object of this invention is the provision of weather-stripping for windows and the like composed of a continuous weather-strip accommodating structure and a one-piece, continuous weather-strip element of substantially a channel-shaped cross section with oppositely disposed, turned-in edges, one of the edges relatively firmly engaging and being substantially immobile in respect to one continuous part of said structure, a continuous lip forming another part of the structure, the other edge of the element compassing and being movable relative to said lip, the latter being adapted to limit the movement of the mobile element edge.

A very important general object of the present invention resides in the provision with a window frame having sliding sashes of weather-strips running the full length of the jambs and effect a full sliding line contact with the sashes, irrespective of their position relative to the frame, whereby not only full weather protection is assured for the window, but whereby both the sashes as well as the weather-strips are subjected to a minimum amount of wear along their lines of contact.

Still another object of the present invention is to provide in a window construction of the type indicated, resilient sash centering or guiding means associated with the opposite ends or outer edges of the side rails of each sash and being adapted to yieldably bear against the corresponding jam portions for the purpose of facilitating an even and effortless operation of the sashes in the window frame, and preventing them from canting.

In addition to the foregoing objects, the present invention involves certain noteworthy advantages, one of them being the employment of a single type of weather-strip in connection with all or practically all places where weather-stripping is required. Thus the same type of weather-strip which is employed in the jambs for engagement with the faces of the side rails of the sashes is employed for sealing the top rail of the upper sash, the meeting rails of the upper and lower sashes, and the connection between the sill and the bottom rail of the lower sash, although for the sealing of some of the sash portions any other suitable weather-stripping may be substituted.

Another important advantage of the present weather-strip construction resides in the provision of an enlarged, safe, rounded-off, bent-in edge formation of the weather-strip, which is intended to engage the side rails of the sashes and is exposed. Due to its particular shape, that edge formation eliminates the possibility of injury to the user of the window.

Another important advantage of the window construction in accordance with the present invention resides in the provision of a lip at the lower inner edge of the bottom rail and of a corresponding groove provided in the window sill for the accommodation of said bottom rail lip, said groove forming the lowermost end of a ridge or elevation constituting the interior part of the sill structure, the interengagement between the lip and the groove being intended for the prevention of ingress of wind and moisture along the bottom rail of the inner sash and the sill.

Another advantage of the present invention resides in providing air and weather tightness between the top rail of the upper sash and the window frame head member, by the formation of cooperating, substantially wedge-shaped ribs, one at the interior face of the head member, and another at the top rail of the upper sash, the cooperation of which rib formations causing the urging of the top rail against the weather-strip held at the inner face of the sash retaining flange which forms a part of the frame head member.

A still further advantage of the present invention involves a novel mullion construction for connecting two adjacent window frames, said mullion construction comprising a plurality of simple clips, hidden within and tightenable against an external hollow molding, said clips being adapted to effectively draw togther such frames, as the clips are being tightened against the molding.

Still another advantage of the present invention involves the construction of a jamb anchor adapted for use in different positions, depending upon whether the window frame is to be mounted in an already existing structure, or during the erection of a new structure.

The foregoing objects, advantages and additional distinctive features of the present invention will become more readily apparent from the following description in conjunction with the accompanying drawings, wherein:

Fig. 1 is a typical vertical cross section through a double hung window, embodying some of the features of the present invention;

Fig. 2 is a typical horizontal cross section through two adjacent windows constructed in accordance with the present invention;

Fig. 3 is an enlarged fragmental detail view in cross section of typical jamb and sash portions and one form of the weather-strip used in the present invention;

Fig. 4 is a fragmental detail view of a sash corner and having guide means for the sash associated with the sash balance attaching member, for limiting the side swing of the sashes;

Fig. 4a is a section taken along lines 4a—4a of Fig. 4;

Fig. 5 is a similar view to that of Fig. 4 with a modified side swing preventing means;

Fig. 5a is still another modification of sash-centering means provided with anti-friction rollers;

Fig. 5b is a section taken on line 5b—5b through Fig. 5a;

Fig. 5c is an end view of a sash balance attaching bracket provided with friction-reducing jamb abutments or rubbing members;

Fig. 5d is a side elevation, partly in section, along line 5d—5d of Fig. 5c;

Fig. 6 is an enlarged fragmental detail view in section of one of the embodiments of the bottom rail weather-strip portion of the window shown in Fig. 1;

Fig. 7 is an enlarged partial detail view in section of one embodiment of the meeting rail weather-strip arrangement of the window as shown in Fig. 1;

Fig. 8 is an enlarged detail view of the wedging rib portions provided at the head frame member and the top rail of the upper sash, with the sash in fully closed position;

Fig. 9 is a fragmental perspective detail view, partly in section, of a jamb portion showing one of its connecting ends;

Fig. 10 is a fragmental perspective illustration, partly in section, of a sill portion adapted for receiving the connecting end of the jamb shown in Fig. 9;

Fig. 13 is a horizontal section through a jamb and a portion of a sash illustrating the modified weather-stripping disclosed in Fig. 11;

Fig. 14 is a fragmental cross section through the meeting rails of the window sashes, equipped with a modified weather-strip and the window lock;

Fig. 15 is a fragmental cross section through the top sash rail in partial engagement with the window frame head member equipped with a modified weather-strip;

Fig. 16 is an enlarged typical cross section through the modified form of the weather-strip, shown in its two extreme positions;

Fig. 17 is an elevation of a corner portion of the lower window sash and frame;

Fig. 18 is a perspective view of a typical section through a part of the bottom rail of the sash;

Fig. 19 is a perspective view, partially in section, of a typical muntin rail with its attaching end;

Fig. 20 is an elevation of a typical mullion arrangement;

Fig. 21 is a perspective view of a mullion channel and a mullion clip;

Fig. 22 is a horizontal section through a portion of a window frame and illustrating a double purpose jamb anchor, shown in full lines, holding the frame in an already erected structure, and in broken lines as used for anchoring the frame during erection of a structure;

Fig. 23 illustrates a double purpose jamb anchor holding the jamb and shown imbedded in a structure being erected; and Fig. 24 is a perspective view of a double purpose jamb anchor.

Figure 12:
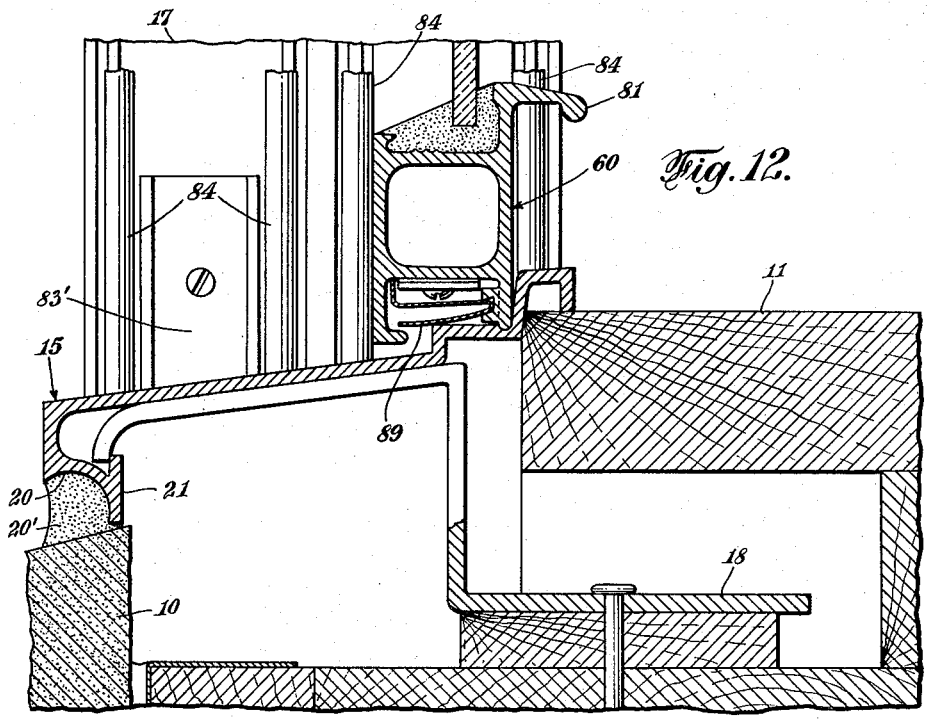
Fig. 12 is a vertical cross section through the lower part of a window structure in accordance with the present invention, showing the bottom rail of the lower sash equipped with another type of a weather-strip.

Referring now specifically to the different figures, and commencing with Figs. 1 to 10, inclusive, numeral 10 designates the outer sill portion of a window opening, whereas numeral 11 denotes the interior bottom portion of such opening which inner portion is shown being constructed from wood. Numeral 12 indicates the masonry header or lintel of the window opening, while number 13 designates the upper portion of the window opening.

*Window frame*

Placed within the window opening is a window structure in accordance with the present invention and which structure is generally indicated at 14. It comprises a window frame composed of a sill member 15, a head member 16 and jambs 17. Sill member 15 is supported partly by the existing masonry or wood sill 10 and partly by the building's sill portion or stool 11 and is held against movement by several anchors 18 (see Fig. 1). The sill member is clearly shown in Fig. 10, and comprises a one-piece element having an outer flange 19 beneath which is arranged a substantially quarter-round recess 20 for the reception of caulking material, indicated at 20'. At the rear of recess 20 is an upward extension 21 adapted for engagement by an anchor 18. Extending at a slant from flange 19 in inward direction is a sill portion 22 terminating in a step 23 provided with a groove 24 and from which groove continues another step formation 25 which is provided with a slanting face 26. This slanting face of step 25 is intended to facilitate the guiding of the bottom rail of the lower sash member to its closing position, as will become presently evident.

Referring now to head member 16, this part of the window frame comprises also a one-piece, substantially channel-shaped unit having an upper, substantially quarter-circular recess formation 27 for the reception of caulking 27', and from which recess formation 27 depends a retaining flange 28 for the top rail of the upper window sash, said flange being provided at its interior face with specially constructed, substantially rail-shaped or H-shaped anchoring means 29 for accommodating weather-strip 30, representing one of the weather-strip embodiments in accordance with the present invention. Extending inwardly from flange 28 is a horizontal web portion 31 from which depends a rib 32. Web portion 31 terminates in an upwardly swung inner flange composed of a channel-shaped ledge 33 and an upward extension 34. Head member 16 is held in place within the window opening by anchor elements 35, the outer end 36 of which engages the juncture between recess formation 27 and flange 28. Anchors 18 for the sill member as well as anchors 35 for the head member are preferably nailed in place, as indicated in Fig. 1.

It will be noted that both the sill member as well as the head member are made of extruded metal, preferably of the non-ferrous type. The sill and head members are connected by jamb members 17, both ends of which are provided with a plurality of lugs, such as longitudinal lugs 37 and 38 and a transverse lug 39 (Fig. 9), for engagement, respectively, with apertures 37', 38' and 39' provided in sill member 15. (Fig. 10.) These lugs are adapted, after having passed through the respective openings in the sill member, to be bent over and forced against the bottom face of the sill member, in the manner indicated in broken lines in Fig. 9. A similar connection is provided between the upper ends of the jamb members and head member 16.

Referring now to Fig 2, jamb members 17 are here shown in section and disclose that the jambs represent one-piece, extruded structures, of which all parts except the weather-stripping are integral. At their interior portions they resemble a substantially E-shaped configuration, while their outer portions are of a substantially C-shaped formation. The jambs have a substantially central connecting web 40, from which extend symmetrically sash retaining flanges 41 and a centrally arranged parting bead or parting strip 42. At the interior faces of the sash retaining flanges, and at both faces of the parting bead there are provided independent weather-strip anchoring means 29, shown enlarged in Fig. 3, for the reception of individual weather-strips 30. These anchoring means constitute substantially H-shaped or rail-shaped structures forming integral parts of the extruded window frame shapes or of the extruded sash members from which the sashes are constructed. These anchoring means have distinct bases and distinct portions extending from the bases, these bases being formed by the bodies of either the extruded frame shapes or of the extruded sash members, while the upper portions of the anchoring means constitute rails in either a channel form, as in Fig. 6, or resembling miniature railroad rails, as in Figs. 3, 7 and 16. In the latter form the anchoring means comprise a relatively short, undercut lip or leg 43 and a longer lip or leg 44 spaced from the base by a recess opposite the undercut for lip 43, these legs or lips being preferably separated by a recess 45. Weather-strip 30, shown in Fig. 3 and in Figs. 1, 2, 6 and 7, comprises a continuous, elongated, substantially channel-shaped structure, one, relatively narrow, bent-in longitudinal edge of which is fixedly but removably associated with the undercut of the shorter leg 43 of anchoring means 29, as indicated at 46, while its other, relatively wider bent-in edge 47 is operative in respect to longer leg 44 of the anchoring means, the inwardly directed portion of bent-in edge 47 of the weather-strip extending into recess 48 formed between the inner face of sash retaining flange 41 and leg 44 of the anchoring means.

Referring to Fig. 2, there extends from the central connecting web 40 of the jamb members and in opposite direction to sash retaining flanges 41, anchoring flanges 48 and 49 terminating into substantially T-shaped end formations 50 and 51, respectively. These end formations are adapted to either serve for engagement by suitable jamb anchors 52 or for providing the mullion connection 53 and 53' as may be clearly observed from Fig. 2.

Window sashes

Operative within the window frame and guided between the sash retaining flanges 41 and the parting strips or beads 42 of jambs 17, and in yieldable engagement with the weather-strips anchored in and operative in respect to the jambs, are outer or upper and lower or inner sashes, generally indicated at 54 and 55, respectively. These sashes are composed of guided side rails 56, which are identical for both upper and lower sashes, a specially designed top rail 57 for the upper sash, a meeting or bottom rail 58 for that sash, an upper or meeting rail 59 for the lower or inner sash and a bottom rail 60 for the latter sash (see Fig. 1).

The side rails, clearly illustrated in cross section in Fig. 2, are of a substantially channel-shaped construction and are provided with suitable seats 61 for a glass pane 62. These seats are provided with flute 63, adapted for the retention of caulking or putty holding the glass in the sash frame. Such fluting is also provided in the glass seat of the top and bottom rails of both sashes.

Referring again to Figs. 1, 2, 4 to 5d and 11 and 13, it will be observed that placed between the parting beads and the sash retaining flanges of the jambs, and partly projecting into the channel-shaped side rails are sash balances 64, from which extend spiral elements 65, connected by means of attaching brackets 66 to sashes 54. It is preferred that between brackets 66 and the sash there are inserted sash-centering or sash guiding elements, such as shown in Figs. 4 and 4a at 67, and in Fig. 5 at 68, in Figs. 5a and 5b at 69. The centering or guiding elements for the sashes are preferably adapted to yieldably engage the faces of central webs 40 of the jambs, thereby not only facilitating the operation of the sashes in up and down directions, but also for centering them in respect to their jambs. In Figs. 4, 4a and 5 simple spring means are employed while in Figs. 1, 2, 5a and 5b there are shown spring-supported, friction-reducing rollers 70 adapted to bear against web 40, while similar rollers 70' are indicated in Figs. 1 and 2 and being mounted at the upper ends of top rail 57 and meeting rail 59. They serve for guiding the upper ends of the sashes, as rollers 70' bear against the spring balances 64.

Another type of sash guiding elements is indicated in Figs. 5c and 5d. These elements may be termed spacing or "rubbing members" and are preferably made of fiber or plastic and are adapted to prevent sash balance attaching brackets 66 from coming into direct contact with the jamb webs of the window frame. These rubbing members may take the shape of either one or two washers 70'', as indicated, however rubbing members of any other shape or arrangement may be substituted, as long as they project beyond brackets 66 and prevent them from damaging the jambs.

Sash top rail

Top rail 57 of the outer or upper sash has a substantially square-tubular cross section, from the upper face of which and somewhat distanced from the inner face of the sash extends a wedging rib 71, which cooperates with rib 32 depending from web 31 of the frame head member. (See the upper portion of Figs. 1 and 15 and Fig. 8.)

Meeting rail of the upper sash

Bottom or meeting rail 58 of the upper sash is also of substantially square-tubular cross section, but is provided with a channel-shaped interior extension 72, the upper flange of which terminating in a downwardly directed lip 73.

Above channel formation 72 there is secured at the center of the upper sash the female portion 74 of window lock 75, the male portion 76 of which is operatively mounted upon the top or meeting rail 59 of the lower or inner sash 55. Depending from the meeting rail 58 of the upper sash is a handle 77 for facilitating the operation of that sash.

*Meeting rail of the lower sash*

Upper or meeting rail 59 of the lower sash is clearly seen in Figs. 1 and 7. It is of substantially square-tubular cross section with an outwardly directed lip 78 adapted for engagement with the channel-shaped portion 72 of the meeting rail 58 of the upper sash. Just below lip 78 there are again provided weather-strip anchoring means 29 of the same construction described in connection with Figs. 1 and 3. The weather-strip 30, anchored along its bottom edge and operative with its upper edge in respect to flange lip 73 of the upper sash meeting rail, is adapted to provide a weathertight seal between the meeting rails 58 and 59 of the two sashes.

*Bottom rail*

Bottom rail 60 of the inner or lower sash is of the square-tubular type and has a depending channel-formation 79 having a longer outer and a shorter inner flange with oppositely directed retaining lips supporting a weather-strip 30, as clearly seen from Figs. 1 and 6. The interior, shorter flange of channel formation 79 has a rounded downwardly directed bead 80 which cooperates with groove 24 provided in sill member 15, as clearly seen in Fig. 6. When the lower sash is being closed, rounded bead 80 is forced to its ultimate interlocking position with groove 24 by gliding over the inclined surface 26 of upper sill extension 25. Projecting inwardly from the uppermost edge of bottom rail 60 is a continuous lift flange 81 extending over substantially the entire width of the sash and facilitating the latter's operation. (See Figs. 1, 2, 12 and 18.)

*Sash stop*

Again referring to Fig. 1, it will be observed that the sash balances 64 for the inner sash are secured to the jambs by means of screws 82. Overlapping the upper end of balances 64 for the inner or lower sash are stop members 83 which are also held in place by the same screws 82. These stop members prevent the lower sash, and especially its lock, from coming into contact with web 31 of head frame member 16. Similar stop members 83' are provided for the upper or outer sash at the bottom ends of the outer sash guides of the jambs, as indicated in Figs. 1, 12 and 13.

*Weather-stripping*

In the embodiment of the present invention illustrated in Figs. 1 to 10, inclusive, the weather-strip employed in the jambs is of substantially a channel-shaped cross section, having smaller and larger bent-in edge formations, the smaller bent-in edge resembling in cross section the letter S, the lower portion of which is anchored in fixed position as it forcibly engages the recess adjacent the undercut, short leg 43 of the weather-strip anchoring means 29, whereas the larger bent-in edge is movable in respect to longer leg 44 of anchoring means 29, and which movable edge is designed to provide a weatherproof seal between the outer faces of the sashes and their respective retaining flanges and parting beads.

The type of weather-stripping provided in the jambs is also used for sealing the top rail of the upper sash in respect to the frame head member, for weatherproofing the meeting rails of the two sashes and for sealing the bottom rail against the sill. Obviously any other suitable weather-strip construction may be employed in any one of the places requiring weather-tightness, however, since the weather-strip of the general shape and operating principle indicated may be employed at, and is equally effective for every part of the window requiring weather-tightness, the advantage of using such all-purpose weather-stripping becomes readily obvious.

Coupled with the advantages of an all-purpose weather-strip is the aforedescribed all-purpose weather-strip support designated here-in as weather-strip anchoring means or anchoring elements, adapted to become practically fully enclosed by the weather-strip structure. These anchoring means are capable of effectively accommodating any number of weather-strip shapes employing substantially the operating principle of weather-strip 30, one bent-in edge of which latter is designed to serve as a pivot, being fixedly held along one portion of the anchoring means, while its other edge encircles and is rendered operative relative to the opposite part of the anchoring means, and provides a yieldable seal for every sash portion to be weatherproofed.

*Modifications*

Different forms of weather-strip constructions are illustrated in Figs. 11 to 16, inclusive, in which are again indicated jamb structures 17 provided with webs 40, from which latter extend sash retaining flanges 41 and parting beads 42, both equipped with the weather-strip anchoring elements 29. As explained previously, the anchoring elements at the interior faces of the sash retaining flanges as well as at both faces of the parting bead have shorter interior and longer exterior extensions or legs 43 and 44, respectively. These legs are separated by a groove 45.

Figure 11:
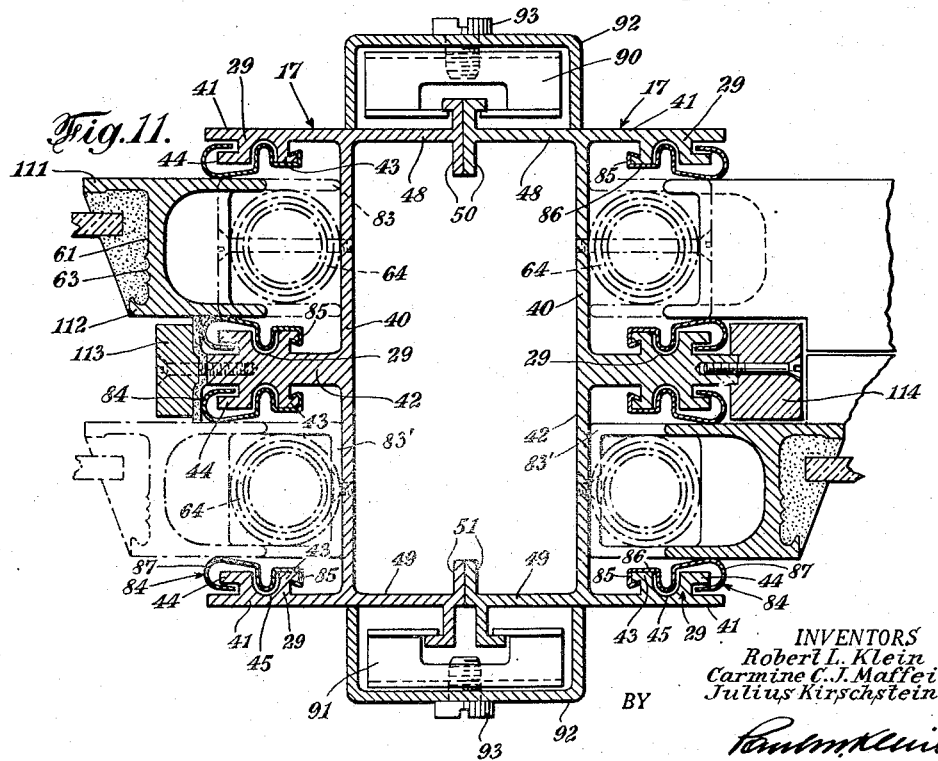
Fig. 11 is a fragmental horizontal section taken through the jambs and the mullion structures of two adjacent windows, including a modified construction of the weather-stripping and meeting rail blocks.

The modified weather-strip 84, illustrated in Figs. 11, 13 and 16 is of substantially a channel-shaped construction similar to that indicated at 30 in Figs. 1 to 10. The interior, turned-in edge 85 of the weather-strip engages the short, undercut leg 43 of the anchoring element 29. Extending from bent-in edge 85 is a short, straight portion 86, and connecting this short portion with the outer, movable and larger bent-in edge 87 of the weather-strip is a hollow rib formation 88 operative within groove 45, as is clearly observable from Fig. 16. By consulting that figure the operation of the weather-strip will become readily understood. The weather-strip is normally held in its full-line position, and may be depressed to assume its extreme dotted line position, from which it will automatically snap back to its normal position when released. Obviously, the weather-strip is not intended to become fully depressed, however its turned-in, movable end may assume any position within the groove formed between the inner face of flange 41 and the outer face of extension or leg 44. Hollow rib 88 serves for preventing an unintentional disengagement of weather-strip 84 from its anchoring means. Also, this modified weather-strip shape 84 completely encloses anchoring means 29.

Referring to Fig. 12, there is disclosed a sill member 15 and a jamb 17, and also the bottom rail 60 of the inner or lower sash. The construction of the depending channel-shaped formation of the bottom rail is the same as that shown in Figs. 1 and 6, however, another type 89 of a weather-strip is substituted for weather-strip 39 or 84.

Referring now to Fig. 14, there are disclosed meeting rails 58 and 59 of two cooperating sashes wherein the modified form of weather-strip 84 is employed. In every other respect the sash construction remains substantially the same.

In Fig. 15 the head member of the window frame and the top rail of the upper sash are shown weatherproofed by modified weather-strip 84. The top rail 57 of the outer sash is shown in a partly closed position, that is in a position just prior to becoming fully closed by the action of the window lock, at which instance the ledge adjacent wedging rib 71 of the sash top rail will be at closer distance from rib 32 of frame head member 16, and that rib will cause the top rail to move outwardly, thereby exerting pressure against and effecting a weather-tight contact with weather-strip 84.

*Mullions, Jamb Anchors and Muntins*

In Fig. 11 two adjacent jamb structures are shown being connected by means of clips 90 and 91 arranged within mullion channels 92 and held in place by screws 93 passing through the channel and engaging a threaded apertures provided in clips 90 and 91. A typical construction of these clips is illustrated in Figs. 20 and 21. In Fig. 13 a jamb mounted in and attached to an erected structure is illustrated, and is held in place by a jamb anchor 94.

In Figs. 17 to 19 is shown the sash construction with different muntins and their attachment to the sash frame. The lower sash 55 is indicated in Fig. 17, and particular attention is directed to the bottom rail 60 thereof, a fragmental illustration in section of which is shown in Fig. 18. The muntins are indicated in Fig. 17, at 95, and the lower attaching end of a muntin is illustrated in Fig. 19. The bottom rail as well as the meeting rail of the sash are drilled as indicated at 96 in Fig. 18, and the muntin rail is milled off to provide an extension 97 which is bent as at 98 to form an attaching lip having a drill hole 99 to register with hole 96 of bottom rail 60. The top ends of muntins 95 are treated similarly to their bottom ends. Rivets or self-threading screws are intended to connect the muntins with the opposite sash rails.

Referring to Figs. 22 to 24, inclusive, there is illustrated a double purpose jamb anchor 94, referred to in connection with Fig. 13, which anchor is so constructed that it facilitates its employment as an anchoring plate for jambs in either existing building structures or in structures being erected. The anchor constitutes a simple stamping having a larger flat portion 100 and an offset smaller flat portion 101, these portions being connected by a slanting step 102. Extending from portion 100 are sidewisely disposed anchoring clips 103, bent at right angles to portion 100. A centrally located clip 104 is provided at the broadened end of portion 109, which latter terminates in opposite anchoring legs 105 arranged symmetrically in respect to center clip 104.

As may be observed from Fig. 22, the double purpose jamb anchor 94, shown in full lines, is so placed in respect to the channel-shaped end of jamb 17 that one of the latter's turned-in flanges 106 is engaged by clip 104 of the jamb anchor, while the upturned side-anchoring clips 103 engage turned-in flange portion 107 of the jamb. The smaller flat portion 101 of the jamb anchor is preferably perforated at 108 and 109 for the reception of either a single spike 110, shown in Fig. 22, or a plurality of spikes or nails, driven into the existing structure to hold the window frame in position. Any number of jamb anchors may be employed in order to properly fasten the window frame in respect to the building structure.

When it is desired to employ the double purpose anchor for fastening of window frames in structures being erected, for instance, in a brick wall, side lugs 103 are either flattened out or knocked off, as indicated in Fig. 22 in broken lines, and both flat portions 100 and 101 are placed into the mortar between two adjacent bricks, while lugs 105 engage the turned-in flanges 106 and 107 of the jamb, as seen in broken lines in Fig. 22.

In observing the cross sections of the sash rails and of the muntins, and particularly referring to Figs. 18 and 19, it will be noted that all of these instrumentalities are provided with relatively wide interior retaining flanges 111 and exterior undercut retaining beads 112, and that between beads 112 and flanges 111 are provided the already mentioned flutes or longitudinal serrations 63 for effectively holding and preventing the shifting of caulking or putty compounds which fasten the window glass in the sashes.

For the purpose of assuring weathertightness between the jambs and the ends of the meeting rails when the window is closed, there are provided blocks 113, 114 of any suitable construction, as indicated at left and right in Fig. 11. They are preferably removably attached to the parting bead 42 of the jambs.

In the drawings illustrating the sashes, spring balances of a specific construction are indicated. It is obvious, however, that any other instrumentality such as counterweights or other types of spring balances may be substituted for those illustrated.

It will be noted that the weather-stripping shown in the first ten figures is somewhat different from that disclosed in Figs. 11 and 13 to 16, inclusive. The latter weather-strip structure is provided with a longitudinal retaining rib or bead 88 adapted to engage a groove in the anchoring means for the weather-strip. The weather-strip structure seen in the first ten figures does not possess such rib formation, but instead it is held in the groove adjacent to undercut short extension 43 of the anchoring element. Both types of weather-strips have substantially channel-shaped cross sections with differently sized turned-in edges, the smaller turned-in edge of which is adapted to remain relatively fixed, while the larger edge formation is movable relative to the weather-strip anchoring means and is adapted to be in yieldable engagement with the faces of the different sash rails.

In practically every portion of the window which is to be weatherproofed, the same type of weather-stripping may be employed. One of the exceptions is the weather-strip 89 in the bottom rail of the lower sash shown in Fig. 12.

In any event, however, the weather-stripping of the present invention is intended to provide a positive, full-line seal between the window frame and the sashes operating therein and to prevent the sashes from rattling, while at the same time facilitating their unrestricted operation in respect to the window frame.

The provisions for centering the sashes in respect to the jambs, as explained in connection with Figs. 4 to 5d, while not absolutely essential, provide very useful and effective means for improving the operation of the sashes in their frames, and prevents the sashes from canting in their guides.

The fact that the jambs and all other parts of the window frame constitute one-piece elements, considerably simplifies the assembly of the frames, reduces unnecessary assembly time and the entailing cost, and eliminates the fitting, attachment and detachment of different parts, as is the case with frames, which, for instance, employ removable sash retaining flanges and parting beads.

*Window assembly*

In assembling the window, including the frame and sashes, first the sash hardware and the sash weatherstrips are associated with the sash units. Thus handle 77 is secured to the meeting rail of the upper sash, the female and male parts of lock 75 are attached to the two meeting rails, and the weather-strips for the meeting rails and the bottom rail are inserted.

A similar procedure is followed in connection with the frame members. At the top of the inner guide channels of the jambs sash stops 83 and sash balances 64 for the lower sash are secured in place. At the upper end of the outer sash guides are attached the required spring balances for the upper sash, and at the bottom end of the guides are located bottom stops 83'. The four weather-strips for each jamb member are slid in position, lugs 37, 38 and 39 of the jambs are inserted in their respective apertures 37', 38' and 39' of the sill, the sashes are placed into their sash guides, and the head member, equipped with the top rail weather-strip, is brought in registry with top lugs 37, 38 and 39 of the jambs. Now the top and bottom jamb lugs are bent to hold and lock all window frame members together. The last function is to bring the springs of balances 64 under proper tension by turning attaching brackets 66, and then securing the latter to their respective sashes.

Obviously any type of sash guiding elements or rubbing members are secured to the sashes and attaching brackets before the window frame is closed.

*Mounting and removing sashes*

While it is preferred to mount the sashes in the window frame prior to fixedly uniting the frame members, each of the two sashes may be readily removed from the finished frame or re-installed in the frame by the simple expediency of first disconnecting and removing the sash balances and thereupon moving the sashes bodily sidewise so that one of their side rails touches web 40 of one of the jambs, thereby clearing their other side rails in respect to the opposite jambs, thus facilitating the removal of the sashes. To re-install the sashes, the above steps are reversed.

In the aforedescribed illustrations preferred forms of the present invention are disclosed. However, it is quite obvious that various changes and improvements may be made to adapt the present window structure to many different requirements, in which event it is to be distinctly understood that such changes and improvements may be incorporated without departing from the broad spirit and scope of the present invention, as defined in the annexed claims.

What is claimed as new is:

1. In a combination resilient sash guide and weather-strip structure for sliding sashes, a window frame for accommodating the sashes, said sash guide and weather-strip structure comprising weather-strips and weather-strip anchoring means, said weather-strip anchoring means forming integral parts of and extending from said frame and comprising short and longer parallel, oppositely directed lips, recesses spacing the lips from the frame, said weather-strips comprising resilient elements having at their opposite edges small and larger channel formations connected by a substantially straight web, and wherein the small channel formation engages the short lip of said anchoring means and is adapted to be relatively stationary, while the larger channel formation compasses and cooperates with the longer lip of said anchoring means and is movable in respect thereto and is adapted, together with said web, to yieldably engage and guide the outer sash faces and to form a seal for the latter.

2. In a weather-strip for windows, continuous weather-strip anchoring means having oppositely disposed, spaced short and longer lips, extending in divergent directions from one another, a continuous resilient element having smaller and larger turned-in edges, a web connecting and spacing them, the smaller edge engaging the short lip of said anchoring means and being substantially stationary, the larger edge and a portion of the web between the smaller and larger edges being movable about said longer lip of said anchoring means, the smaller stationary edge serving, virtually, as a pivot for the movable parts of the element.

3. In a weather-stripping construction for windows employing extruded frame and sash elements, weather-strip anchoring means forming integral parts of the frame elements and extending from them and having two continuous lips extending from one another in opposite directions, one lip being relatively narrow and having an undercut, the other being wider, a recess spacing it from the frame elements, a continuous weather-strip of a multiple channel-shaped cross section having smaller and larger turned-in channel-shaped edges spaced by a web, the smaller edge engaging said narrow, undercut lip and being substantially stationary in respect thereto, the larger turned-in edge and the web between the two edges being movable in respect to the wider lip, said smaller edge serving as pivot for the movable parts of the weather-strip.

4. In a weather-stripping construction for windows, employing extruded frame and sash elements, weather-strip anchoring means extending from said frame elements and forming extruded, integral parts thereof and having two continuous lips extending in opposite directions from each other, one being relatively narrow and having an undercut, the other being wider and being spaced from the frame elements, a continuous groove disposed between the lips, a continuous weather-strip of a multiple channel-shaped cross section having smaller and larger turned-in channel-shaped edges, a web connecting them, and a weather-strip retaining rib arranged in the web between these edges, the smaller edge fixedly engaging said narrow lip, the larger edge compassing the wider lip, that larger edge and the web between the lips, including said rib, being movable in respect to the anchoring means, said rib being movable relative to said groove, said smaller turned-in edge serving virtually as a pivot for the movable portions of the weather-strip.

5. In weather-stripping for windows, a continuous, multiple channel-shaped element having relatively small and larger turned-in, substantially channel-forming edges extending in opposite directions from one another, a continuous element-accommodating structure including relatively short, lip-shaped means for holding the small channel-forming edge in substantially stationary position and other relatively wide, lip-shaped means for facilitating a limited movement of the larger channel-forming edge, said short and wide lip-shaped means constituting continuous integral parts of said structure, said larger channel-forming element edge compassing and being movable relative to said wide lip-shaped means.

6. In a double hung window construction including frame jambs having sash-retaining flanges and parting beads, the combination with the jamb sash-retaining flanges and the parting beads, of continuous weather-strip anchoring means integral with said flanges and said parting beads, and comprising a sash side rail structure having oppositely directed lips, one being narrow and having an undercut, the other being wider, a recess spacing the wider lip from the flanges and parting beads, continuous weather-strips fixedly engaging the narrow lips but being movable in respect to the wider lips of said anchoring means and extending along the window frame and being in resilient, sliding engagement with the sash side rails along continuous contact lines, said weather-strip being of a multiple channel-shaped cross section with larger and smaller bent-in, channel-forming continuous edges, one bent-in edge being smaller and engages the narrow lip, the other being substantially larger, the smaller bent-in edge being substantially stationary, while the larger edge is mobile in respect to the wider lip and to the exposed edges of the sash retaining flanges and of the parting beads, and effects the desired sliding line contact with the sash side rails.

7. In a weather-strip construction for windows made from extruded elements; continuous, weather-strip anchoring means extending from the bodies, of these elements and along their entire length and constituting integral extruded parts of said elements and being composed of a pair of continuous, parallel lips, one lip being relatively small the other being larger, both lips being spaced from the element bodies by continuous recesses; a substantially channel-shaped, continuous weather-strip removably associated with and being movable relative to said anchoring means and having spaced bent-in edges extending in opposite direction from each other, one edge being relatively narrow, the other being wider, both edges having edge portions directed inwardly and toward one another, a resilient, substantially straight web connecting said bent-in edges, said narrow bent-in edge tensionally engaging the small lip of the anchoring means so that the web and the larger bent-in edge of the weather-strip are normally held at spaced position from the bodies of the extruded elements and are rendered movable toward the element bodies when subjected to pressure applied to either the web or to the larger bent-in edge of the weather-strip.

8. In a weather-strip construction as in claim 7, and wherein said anchoring means are of substantially a channel formation having opposite flanges connected by a base, said continuous small and larger lips extending toward one another from the interior faces of the flanges, the resilient spacing web and the wider bent-in edge of the weather-strip normally assuming a spaced position from the connecting base for the flanges, the larger lip serving as an abutment for the wider bent-in edge of the weather-strip, thereby limiting the latter's outward movement.

9. In a weather-strip construction as in claim 7, and wherein said anchoring means comprise a substantially rail-shaped structure, the continuous small and longer lips of which extend in opposite direction from each other, the narrow bent-in edge of said weather-strip tensionally engaging the small lip, the wider bent-in edge of the weather-strip compassing and cooperating with the larger lip and extending with its inwardly directed edge portion into and being movable within the recess spacing the larger lip from the element bodies.

10. In a weather-strip construction as in claim 7, and wherein said anchoring means comprise a substantially rail-shaped structure, the continuous small and larger oppositely directed lips of which are separated by a continuous groove.

11. In a weather-strip construction as in claim 7, and wherein said anchoring means comprise a substantially rail-shaped structure, the continuous small and larger oppositely directed lips of which are separated by a continuous groove, and a hollow rib provided in said web of the weather-strip and being adapted to cooperate with said groove for preventing unintentional disengagement of the weather-strip from the anchoring means.

ROBERT L. KLEIN.
CARMINE C. J. MAFFEI.
JULIUS KIRSCHSTEIN.

References Cited in the file of this patent

UNITED STATES PATENTS

| Number | Name | Date |
|---|---|---|
| 749,897 | Fournier | Jan. 19, 1904 |
| 841,658 | Bader | Jan. 22, 1907 |
| 1,751,720 | White | Mar. 25, 1930 |
| 1,793,504 | Michaels | Feb. 24, 1931 |
| 1,815,718 | Lane | July 21, 1931 |
| 1,879,340 | Lamping | Sept. 27, 1932 |
| 1,906,475 | Madsen | May 2, 1933 |
| 1,919,367 | Hamm et al. | July 25, 1933 |
| 2,057,974 | Plym | Oct. 20, 1936 |
| 2,057,975 | Plym | Oct. 20, 1936 |
| 2,066,051 | Pettit | Dec. 29, 1936 |
| 2,077,056 | Plym | Apr. 13, 1937 |
| 2,084,776 | Peremi et al. | June 22, 1937 |
| 2,120,614 | Jorss | June 14, 1938 |
| 2,200,547 | Grady et al. | May 14, 1940 |
| 2,200,548 | Grady et al. | May 14, 1940 |
| 2,211,887 | Elmer | Aug. 20, 1940 |
| 2,250,723 | Peremi et al. | July 29, 1941 |
| 2,257,703 | Peremi et al. | Sept. 30, 1941 |
| 2,295,689 | Renton | Sept. 15, 1942 |
| 2,299,651 | Peremi et al. | Oct. 20, 1942 |
| 2,310,247 | Lunken et al. | Feb. 9, 1943 |
| 2,345,088 | Beil | Mar. 28, 1944 |